United States Patent [19]
Widom et al.

[11] Patent Number: 5,838,958
[45] Date of Patent: Nov. 17, 1998

[54] AUTOMATIC TRACK FOLLOWING SYNC TIMING

[75] Inventors: Joel M. Widom, Laguna Beach; David L. Hill, Irvine, both of Calif.

[73] Assignee: Aiwa Co., Ltd., Tokyo, Japan

[21] Appl. No.: 656,741

[22] Filed: Jun. 3, 1996

Related U.S. Application Data

[60] Provisional application No. 60/004,724 Oct. 2, 1995.

[51] Int. Cl.$^6$ ................................................ G11B 15/18
[52] U.S. Cl. ............................................. 395/559; 360/69
[58] Field of Search ............................... 395/559; 360/69, 360/71, 75, 551, 73.07

[56] References Cited

U.S. PATENT DOCUMENTS

| 5,119,249 | 6/1992 | Uchikosh | 360/77.15 |
| 5,287,478 | 2/1994 | Johnston et al. | 360/75 X |
| 5,398,140 | 3/1995 | Rhodes et al. | 360/48 |

FOREIGN PATENT DOCUMENTS

WO 93/03437  2/1993  WIPO .

OTHER PUBLICATIONS

Japanese Patent Abstract, Publication No. JP60000644; Publication Date: Jan. 5, 1985; Inventor: Yamazaki Shigeru; Entitled: Automatic Tracking Controller.
Japanese Patent Abstract, Publication No. JP5314594; Publication Date: Nov. 26, 1993; Inventor: Tada Yukinobu; Entitled: Tracking Device.
Japanese Patent Abstract, Publication No. JP6004945; Publication Jan. 14, 1994; Inventor: Takayama Nobutoshi; Entitled: Reproducing Device for Video Signal.

*Primary Examiner*—Thomas M. Heckler
*Attorney, Agent, or Firm*—Fulbright & Jaworski L.L.P.

[57] ABSTRACT

A method and apparatus for effectively adjusting signal characteristics such that they can be used with incompatible recording formats. In particular, the method and apparatus may be used to adjust the ATF sampling pulse width externally to shorten the sampling time. An externally generated timing signal controls the switches connected in series with charge holding capacitors for shortening the sampling time of the ATF sampling pulse width generated by a servo chip, such as a Hitachi HD49228FS servo chip. In the latter part of the ATF sampling pulse, the externally generated control signal opens up the switches, thus inhibiting further charging into the capacitors.

20 Claims, 2 Drawing Sheets

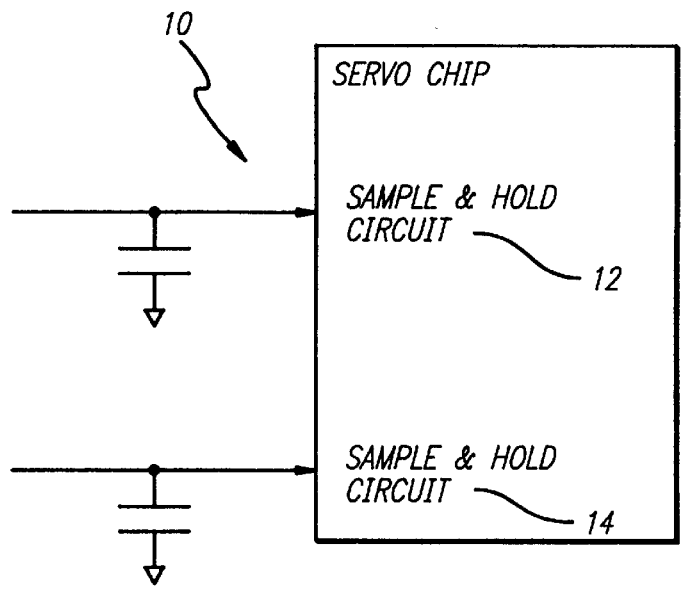
FIG. 1
(PRIOR ART)
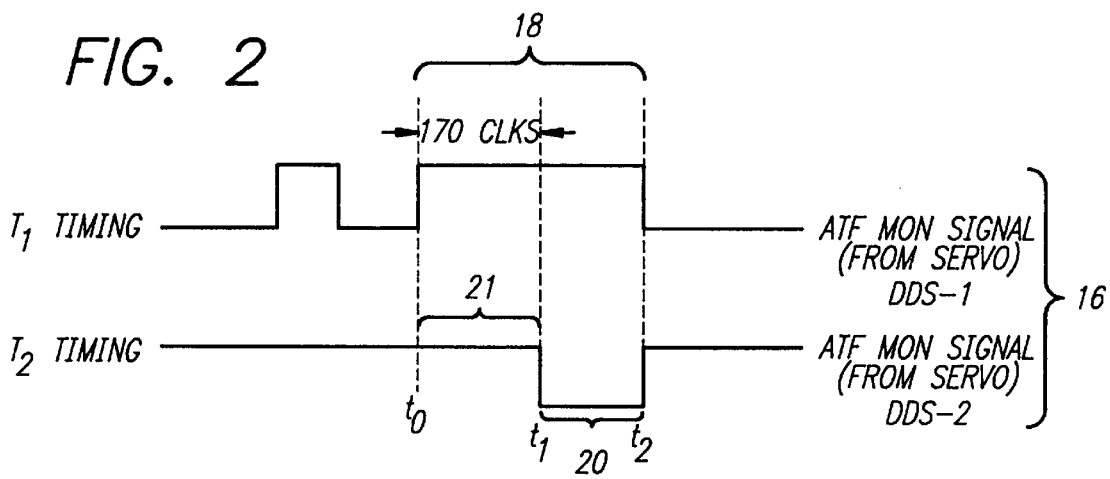
FIG. 2
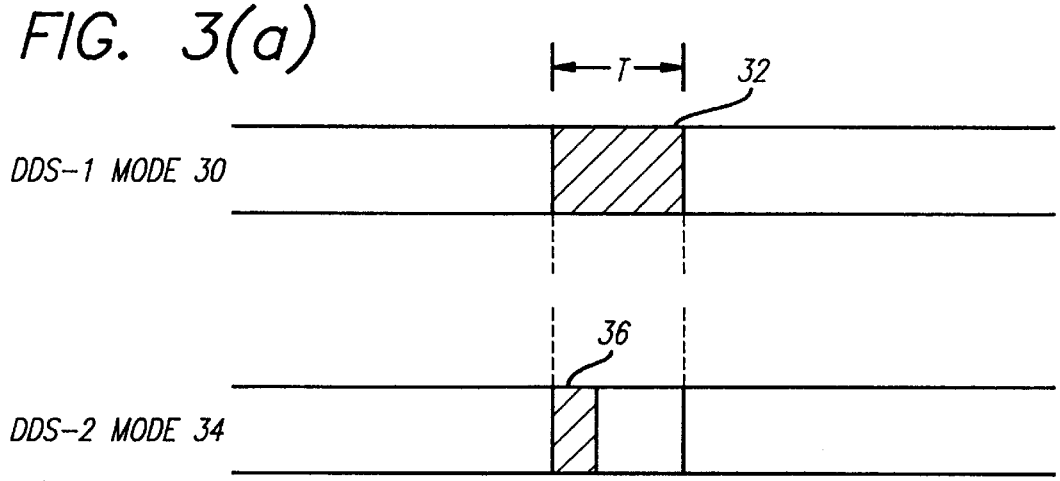
FIG. 3(a)
FIG. 3(b)

AUTOMATIC TRACK FOLLOWING SYNC TIMING

REFERENCE TO RELATED APPLICATION

This application claims the benefit of U.S. Provisional Application No. 60/004,724, filed Oct. 2, 1995.

BACKGROUND OF THE INVENTION

1. Field of the Invention

The present invention relates generally to digital data storage tape positioning systems, and more particularly to automatic track following systems.

2. Description of the Prior Art

Digital data is conventionally stored on magnetic media such as magnetic tape or diskette in the form of flux transitions on the surface of the media. Data recovery consists of determining the presence, and relative timing, of such flux transitions. Optimal operation of a recording device therefore depends upon the proper orientation and position of the magnetic head. Otherwise, the use of an improperly oriented and positioned recording head may result in the information being recorded in a manner that cannot be accurately retrieved on playback. Similarly, an improperly oriented or positioned playback head may result in the inaccurate retrieval of information even if the information was properly recorded. In either case, the integrity of the information storage system may be compromised and information may be lost.

Conventionally, automatic track following (ATF) systems provide accurate tracking for the read/write functions thus insuring accuracy of data transfer. Standard magnetic tapes typically contain ATF marks for detection by ATF systems. Two standard recording formats for storage of information are digital data storage-1 (DDS-1) and digital data storage-2 (DDS-2). The DDS-1 format has an ordinary track pitch while the DDS-2 has a narrower track pitch. Consequently, the readout timings associated with the two recording formats are different. Automatic track following (ATF) is provided based on the particular DDS standard i.e. DDS-1 or DDS-2.

Problems thus arise when components designed for different recording formats, i.e. DDS-1 and DDS-2, are integrated into a common system. For example, the ATF sampling pulse width generated by a DDS-1 formatted Hitachi HD49228FS servo chip is too wide for DDS-2 mode usage, resulting in incorrect samples. When this happens, the signal may be missed completely, thereby injecting erroneous information into the tracking servo loop. Generally, the area of an ATF zone in the DDS-2 mode is smaller than the area of an ATF zone in the DDS-1 mode. A read head, reading the information in the ATF zone for the same period T, will detect an amplitude smaller than that detected for the DDS-1 mode. Consequently, incorrect data about the value of the zone of interest results.

What is needed therefore is a method and apparatus for effectively adjusting signal characteristics such that they can be used with incompatible recording formats. In particular, what is needed is a method and apparatus for adjusting the ATF sampling pulse width externally to shorten the sampling time.

SUMMARY OF THE INVENTION

The preceding and other shortcomings of prior art methods and systems are overcome by the present invention which provides a method and apparatus for effectively adjusting signal characteristics such that they can be used with incompatible recording formats. More particularly, the present invention provides a method and apparatus for adjusting the ATF sampling pulse width externally to shorten the sampling time. An externally generated timing signal for controlling switches is connected in series with charge holding capacitors for shortening the sampling time of the ATF sampling pulse width generated by a servo chip, such as a Hitachi HD49228FS servo chip. In the latter part of the ATF sampling pulse, the externally generated control signal opens up the switches, thus inhibiting further charging into the capacitors.

In particular, the present invention provides an apparatus for externally adjusting an ATF signal having a sampling pulse width. The apparatus comprises a timing means for generating an external timing signal, an external switch comprising a first input for receiving the ATF sampling pulse and a second input for receiving the external timing signal, and at least one external capacitor connected in series with the external switch for receiving an output of the external switch, thereby shortening the sampling time of the ATF sampling pulse width.

In another aspect, the present invention provides an apparatus, comprising a computer usable medium having computer readable program code means embodied therein for adjusting signal characteristics of a DDS-1 generated ATF signal having a signal pulse width for use with DDS-2. The computer readable program code means in the apparatus comprises computer readable code means for causing the computer to effect a timing means to generate a timing signal, computer readable code means for causing the computer to effect a switch comprising a first input to receive the DDS-1 generated ATF signal and a second input to receive the timing signal for generating a timed ATF signal, and computer readable code means for causing the computer to effect capacitor means connected in series with the switch to generate shortened ATF sampling pulse width in response to the timed ATF signal.

In still another aspect, the present invention provides an apparatus, comprising a computer usable medium having computer readable program code means embodied therein for externally adjusting a signal having a sampling pulse width. The computer readable program code means in the apparatus comprises computer readable program code means for causing a computer to effect a timing means to generate an external timing signal, computer readable program code means for causing the computer to effect an external switch comprising a first input to receive the signal and a second input to receive the external timing signal, and computer readable program code means for causing the computer to effect at least one external capacitor connected in series with the external switch to receive an output of the external switch, thereby shortening the sampling time of the signal.

In yet another aspect, the present invention provides a program storage device readable by a machine, tangibly embodying a program of instructions executable by the machine to perform method steps for externally adjusting an ATF signal having a sampling pulse width. The method steps comprise causing a computer to effect a timing means to generate an external timing signal, causing the computer to effect an external switch comprising a first input to receive the ATF sampling pulse and a second input to receive the external timing signal, and causing the computer to effect at least one external capacitor connected in series with the external switch to receive an output of the external switch, thereby shortening sampling time of the ATF sampling pulse width.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

BRIEF DESCRIPTION OF THE DRAWINGS

FIG. 1 is schematic diagram of a conventional sample-and-hold circuit in accordance with the present invention;

FIG. 2 is a series of graphs on the same time scale showing the ATF MON signal at several points in the DDS-1 and DDS-2 modes in accordance with the present invention;

FIG. 3(a) is a detailed illustration of an ATF zone in the DDS-1 mode in accordance with the present invention;

FIG. 3(b) is a detailed illustration of an ATF zone in the DDS-2 mode for the same period shown in FIG. 3(a) in accordance with the present invention;

DETAILED DESCRIPTION OF THE PREFERRED EMBODIMENT(S)

Figure 4:
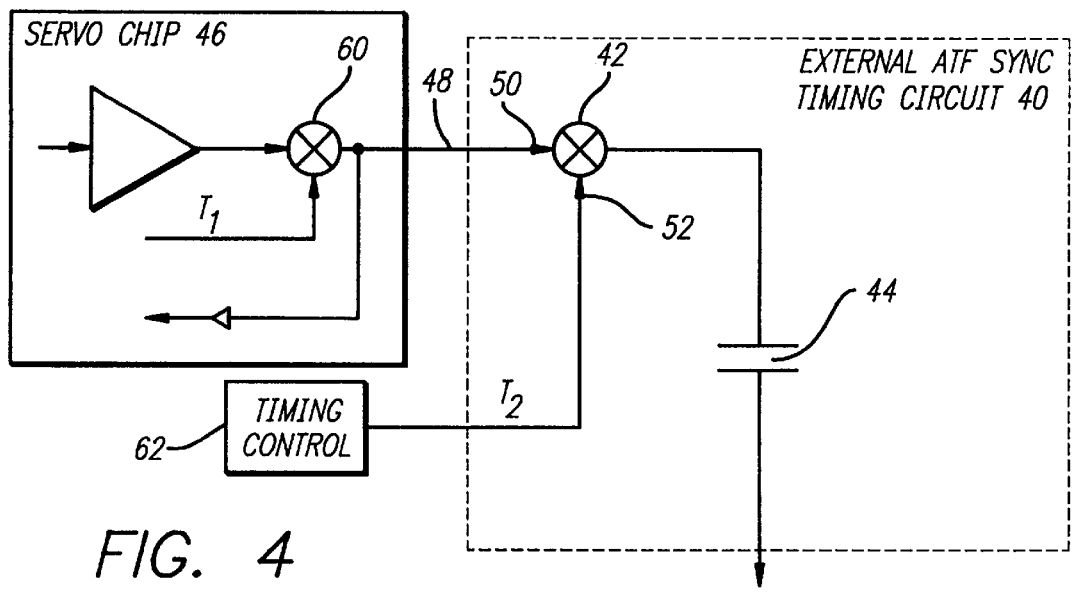
FIG. 4 is a schematic diagram of an external ATF sync timing circuit constructed in accordance with the present invention.

The present invention provides a method and apparatus for effectively adjusting signal characteristics such that they can be used with incompatible recording formats. More particularly, the present invention provides an apparatus and method for adjusting the ATF sampling pulse width externally to shorten the sampling time. As illustrated in FIG. 4 and described in detail below, an externally generated timing signal for controlling the analog switches is connected in series with one or more charge holding capacitors for shortening the sampling time of the ATF sampling pulse width generated by a servo chip, such as a Hitachi HD49228FS servo chip operating in the DDS-1 mode. In the latter part of the ATF sampling pulse, the externally generated control signal turns off the analog switches, thus inhibiting further charging into the capacitors.

As is well known to those skilled in the art, an automatic track following (ATF) system is commonly used to accurately position the read/write head on the tracks of a magnetic tape. Standard format tapes contain ATF marks for detection by ATF systems. Two standard recording formats for storage of information are digital data storage-1 (DDS-1) and digital data storage-2 (DDS-2). The DDS-1 format has an ordinary track pitch while the DDS-2 has a narrower track pitch. Consequently, the readout timings associated with the two recording formats are different. Automatic track following (ATF) is provided based on the particular DDS standard i.e. DDS-1 or DDS-2.

ATF blocks are generally located to ATF zone 1 and ATF zone 2 on the track. A main zone is located between ATF zone 1 and ATF zone 2. Each ATF zone consists of a combination of four signals having different channel bit patterns recorded at different physical recording densities. These signals are: (1) ATF pilot signal; (2) ATF sync signal 1; (3) ATF sync signal 2; and (4) ATF space signal. Typically, to detect a track error, the frequency and length of the ATF sync signal is detected. Then, cross talk from the ATF pilot signal of an adjacent track is sampled. A fixed period later, the cross talk signal from the ATF pilot signal of the other adjacent track is sampled. The tracking error is the difference between the levels of those two cross talk signals.

An analog band pass filter is conventionally used to detect the tracking sync marks within the ATF field. Referring to FIG. 1, once the tracking sync mark is detected, a series of timing signals are generated for sample-and-hold circuits 12 and 14 in the servo chip 10. The levels of the pilot signal cross talk from the two adjacent tracks are determined utilizing separate sample-and-hold stages. To determine the difference between the two pilot signals, an operational amplifier and a final sample-and-hold stage are commonly used. Consequently, servo error signal can be determined.

Problems arise when components designed for different recording formats, i.e. DDS-1 and DDS-2, are integrated in a common system. Referring to FIG. 2, a series of graphs on the same time scale showing the ATF MON signal 16 at several points in the DDS-1 and DDS-2 modes in accordance with the present invention is shown. The ATF sampling pulse width 18 generated by a DDS-1 formatted device, such as the Hitachi HD49228FS servo chip, is too wide for DDS-2 mode usage, resulting in incorrect samples. When this happens, the ATF signal 16 may be missed completely, thereby injecting erroneous information into the tracking servo loop.

Referring to FIGS. 3(a) and 3(b), generally, the area of the ATF zone 36 in the DDS-2 mode is smaller than the area of the ATF zone 32 in the DDS-1 mode. A read head, reading the information in the ATF zone 36 in the DDS-2 mode for the same period T, will detect an amplitude smaller than that detected for the DDS-1 mode. When this happens, incorrect data about the value of the zone of interest results. Consequently, referring to FIG. 2, the ATF sampling pulse width 18 generated by a Hitachi HD49228FS would typically be too wide for DDS-2 mode usage.

The present invention provides a method and apparatus for effectively adjusting signal characteristics such that they can be used with incompatible recording formats. In particular, the present invention provides a method and apparatus for adjusting the ATF sampling pulse width externally to shorten the sampling time. Referring to FIG. 3(a), in operation, a read head reads the information in the ATF zone 32 for a period T and the amplitude is detected and held. Typically, such a pulse may be generated by a servo chip, such as a Hitachi HD49228FS servo chip.

Referring to FIG. 3(b), the area of the ATF zone 36 in the DDS-2 mode 34 is smaller than the area of the ATF zone 32 in the DDS-1 mode 30 shown in FIG. 3(a). A read head, reading the information in the ATF zone 36 for the same period T for the DDS-2 mode 34, will detect an amplitude smaller than that detected for the DDS-1 mode 30. When this happens, incorrect data regarding the value of the zone of interest results. An ATF sampling pulse width generated by a Hitachi HD49228FS would typically be too wide for DDS-2 mode usage.

Additionally, the sync signal may arrive before the prior track pilot sample is closed, and a sync signal shock wave from the sync signal through the pilot filter will produce an erroneous offset in the ATF servo loop. Unless the sampling time can be shortened, a servo chip operating in the DDS-1 mode probably cannot be effectively used for ATF tracking when used with DDS-2 compatible type devices. Generally, the width of the pulse generated by the servo chip cannot be internally adjusted.

Referring to FIG. 4, in accordance with the present invention, an external ATF sync timing circuit 40 for adjusting the ATF sampling pulse width externally to shorten the sampling time is illustrated. The external ATF sync timing circuit 40 includes an external switching device 42 and one or more sampling capacitors 44, connected in series.

The output of the servo chip 46, the ATF sampling pulse 48, is applied to the input 50 of the external ATF sync timing circuit 40. The servo chip 46 typically includes a switching device 60 controlled by a timing signal $T_1$. In operation, the ATF sampling pulse 48 is applied to one input 50 of the external switching device 42. An external timing signal, $T_2$, applied to the other input 52 of the external switching device 42, controls the external switching device 42 connected in series with the charge holding capacitor 44, thus shortening the sampling time of the ATF sampling pulse width generated by the servo chip 46.

The external switching device 42 opens and closes in accordance with timing signal $T_2$. The timing signal $T_2$ is determined in accordance with the difference between the existing and desired sampling pulse width. In particular, the timing signal $T_2$ is determined in accordance with the difference between the pulse width of the ATF sampling signal in the DDS-1 mode and the DDS-2 mode, as shown in FIGS. 3(*a*) and 3(*b*). Thus, in accordance with the present invention, the ATF sampling pulse width may be adjusted to a compatible pulse width by controlling the time the external switching device 42 is opened and closed.

In operation, by closing the external switching device 42, the external sync timing circuit 40 becomes a closed loop and the current from the ATF sampling pulse generated by the servo chip 46 charges and discharges through the external capacitor 44. When the external switching device 42 is opened, the external capacitor 44 is cut off from the remainder of the sync timing circuit 40 and no longer receives current. Thus, in accordance with the present invention, the external ATF sync timing circuit 40 includes an external switching device 42 is open during a predetermined period of time to accordingly shorten the pulse width of the ATF sampling signal so that it is compatible with another mode of operation, such as the DDS-2 mode.

In operation, referring to FIGS. 2 through 4, at, or approximately at, time $t_0$, switching devices 42 and 60 are both closed. The external capacitor 44 is charged by the input voltage from the ATF sampling pulse 48 generated by the servo chip 46. At, or approximately at, time $t_1$, the external timing signal $T_2$ is inverted, thus causing the external switching device 42 to open. The external capacitor 44 is no longer being charged and the voltage stored is held until the external switching device 42 is closed again. The external timing signal $T_2$ remains inverted until at, or approximately at, time $t_2$ at which time the external switching device 42 is closed again. Referring to FIG. 2, $t_1$ to $t_2$ represents the time period required to shorten the ATF sampling pulse to the correct pulse width. Thus, in accordance with the present invention, the ATF sampling pulse width which would have been too wide is adjusted to a compatible pulse width.

A microprocessor type device is preferably used to control the timing of $T_2$, thereby allowing the external switching device 42 to be automatically opened or closed, thus allowing the ATF sampling pulse width to be accordingly adjusted. The external switch 42 and external sampling capacitor 44 may be commercially available devices.

As shown in FIG. 4, the switching device 60 in the servo chip 46 is controlled by timing signal $T_1$. In accordance with another embodiment of the present invention, a single timing signal circuit may be used to allow both the switching device 60 in the servo chip 46 and the external switching device 42 in the external ATF sync timing circuit 40 to be controlled by only one timing signal.

Figure 5:
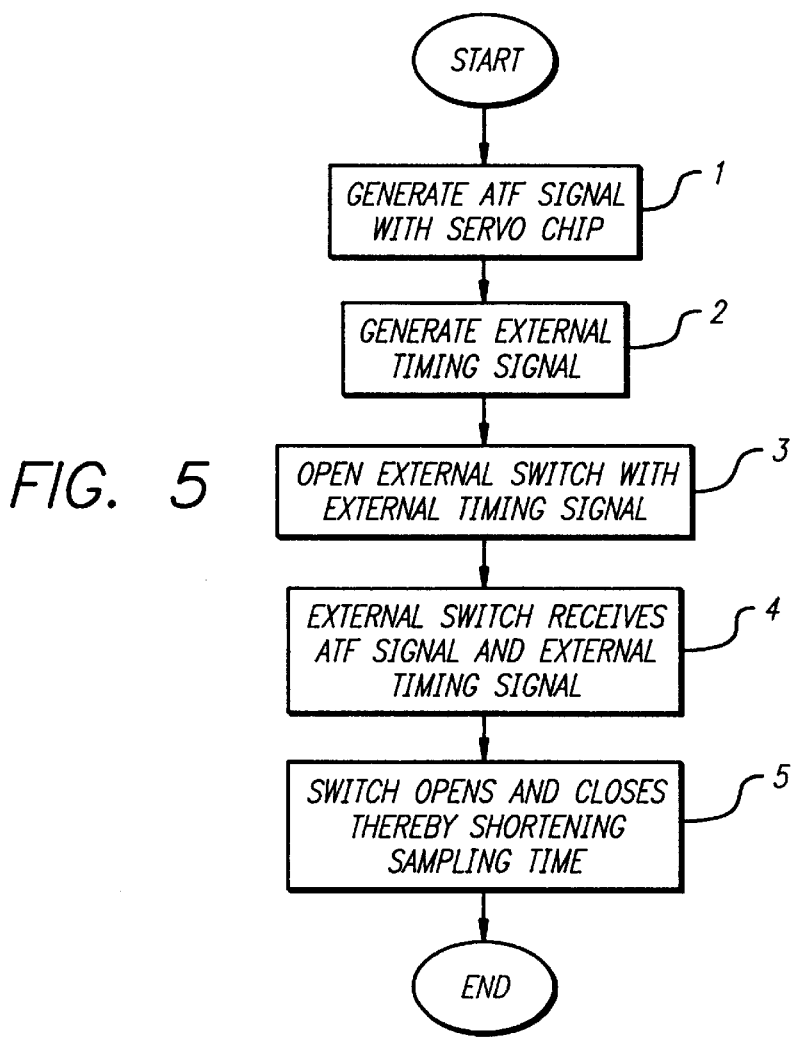
FIG. 5 is a flow chart of the external ATF sync timing in accordance with the present invention.

Referring to FIG. 5, a flow chart of the ATF sync timing in accordance with the present invention is shown. A program storage device readable by a machine, such as a microprocessor, tangibly embodies a program of instructions executable by the machine to perform the steps for externally adjusting the ATF signal having a sampling pulse width. Such a timing control is represented by the timing control block 62 in FIG. 4. In step 1, a servo chip, such as a Hitachi HD49228FS servo chip, generates the ATF signal in a DDS-1 mode. In step 2, the timing means generates an external timing signal. The external timing signal opens the external switch in a latter part of the ATF signal, thus inhibiting further charging into the capacitor (step 3). In step 4, the external switch receives the ATF signal at a first input and the external timing signal at a second input. In step 5, at least one external capacitor is connected in series with the external switch to receive an output of the external switch, thereby shortening the sampling time of the ATF signal sampling pulse width (step 6).

It will be appreciated by persons skilled in the art that the present invention is not limited to what has been shown and described hereinabove, nor the dimensions of sizes of the physical implementation described immediately above. For example, the external timing circuit shown in FIG. 4 and described in detail above is not limited to adjusting the ATF sampling pulse width externally to shorten the sampling time. Rather the present invention may be used to adjust the pulse width of any signal having an incompatible format.

What is claimed is:

1. An apparatus for externally adjusting an automatic track following (ATF) signal having a sampling pulse width, comprising:

a timing means for generating an external timing signal to shorten the width for said sampling;

an external switch comprising a first, signal input for receiving said ATF sampling pulse and a second, control input for receiving said external timing signal; and at least one external capacitor connected in series with said external switch for receiving an output signal responsive to said ATF sampling pulse, shortened from said sampling pulse width under control of said timing signal.

2. The apparatus claimed in claim 1, wherein said timing means for generating an external timing signal, comprises:

means for causing said external timing signal to open said external switch in a latter part of said ATF sampling pulse width, inhibiting further response by said output signal to said ATF sampling pulse.

3. The apparatus claimed in claim 1, further comprising:
   a servo chip for generating said ATF signal.

4. The apparatus claimed in claim 3, wherein said servo chip is a Hitachi HD49228FS servo chip.

5. The apparatus claimed in claim 3, wherein said servo chip for generating said ATF signal, comprises:

means for generating said ATF signal in a digital data storage-1 (DDS-1) mode.

6. An apparatus, comprising:

a computer usable medium having computer readable program code means embodied therein for adjusting signal characteristics of a digital data storage-1 (DDS-1) generated automatic track following (ATF) signal having a signal pulse width for use with digital data storage-2 (DDS-2), the computer readable program code means in said apparatus comprising:

computer readable code means for causing the computer to control a timing means to generate a timing signal;

computer readable code means for causing the computer to control a switch comprising a first input to receive said DDS-1 generated ATF signal and a second input to receive said timing signal for generating a timed ATF signal; and computer readable code means for causing the computer to control connection of capacitor means in series with said switch for receiving an output signal responsive to said ATF signal, having a shortened signal pulse width for DDS-2.

7. The apparatus claimed in claim 6, wherein said computer readable program code means comprises:

computer readable code means for causing the computer to control said shortened signal pulse width to be compatible with DDS-2 format.

8. The apparatus claimed in claim 7, wherein said computer readable program means comprises:

computer readable code means for causing the computer to control said timing signal to open said switch in a latter part of said ATF signal pulse, thus inhibiting further response by said output signal to said ATF signal pulse.

9. The apparatus claimed in claim 8, wherein said computer readable program code means comprises:

computer readable code means for causing the computer to control a servo chip to generate said ATF signal.

10. The apparatus claimed in claim 9, wherein said computer readable code means for causing the computer to control a servo chip to generate said ATF signal, comprises:

computer readable code means for causing the computer to control a Hitachi HD49228FS servo chip to generate said ATF signal.

11. An apparatus, comprising:

a computer usable medium having computer readable program code means embodied therein for externally adjusting a sample signal having a sampling pulse width, the computer readable program code means in said apparatus comprising:

computer readable code means for causing a computer to control a timing means to generate an external timing signal;

computer readable code means for causing the computer to control an external switch comprising a first input to receive said signal and a second input to receive said external timing signal; and computer readable code means for causing the computer to control connection of at least one external capacitor in series with said external switch to receive an output signal responsive to said sample signal, having a shortened sampling pulse width.

12. The apparatus claimed in claim 11, wherein said computer readable program code means comprises:

computer readable code means for causing the computer to control said external timing signal to open said external switch in a latter part of said sample signal, inhibiting further response by said output signal to said sample signal.

13. The apparatus claimed in claim 12, wherein said computer readable program code means comprises:

computer readable code means for causing the computer to control a device to generate said sample signal.

14. The apparatus claimed in claim 13, wherein said device is a Hitachi HD49228FS servo chip.

15. The apparatus claimed in claim 13, wherein said computer readable code means for causing the computer to control a device to generate said sample signal, comprises:

computer readable code means for causing the computer to control generating of an automatic track following (ATF) sample signal in a digital data storage-1 (DDS-1) mode.

16. A program storage device readable by a machine, tangibly embodying a program of instructions executable by the machine to perform method steps for externally adjusting an automatic tracking following (ATF) signal having a sampling pulse width, said method steps comprising:

causing a computer to control a timing means to generate an external timing signal;

causing the computer to control an external switch comprising a first input to receive said ATF sampling pulse and a second input to receive said external timing signal; and causing the computer to control the connection of at least one external capacitor in series with said external switch to receive an output signal responsive to said ATF signal, having a shortened sampling pulse width.

17. The method claimed in claim 16, wherein said step of causing a computer to control a timing means to generate an external timing signal, comprises the step of:

causing the computer to control said external timing signal to open said external switch in a latter part of said ATF sampling pulse, inhibiting further response by said output signal to said ATF signal.

18. The method claimed in claim 16, further comprising the step of:

causing the computer to control a servo chip to generate said ATF signal.

19. The method claimed in claim 18, wherein said servo chip is a Hitachi HD49228FS servo chip.

20. The method claimed in claim 18, wherein said step of causing the computer to control a servo chip to generate said ATF signal, comprises the step of:

causing the computer to control said servo chip to generate said ATF signal in a digital data storage-1 (DDS-1) mode.

* * * * *